H. P. HANSON.
HAY SLING.
APPLICATION FILED MAR. 25, 1910.
964,250.
Patented July 12, 1910.
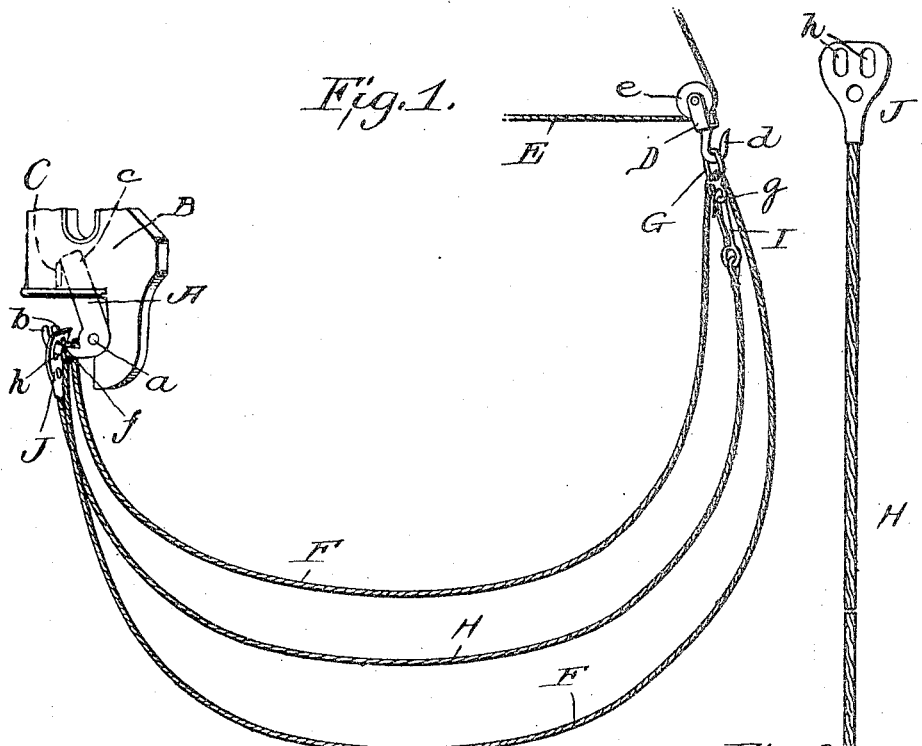
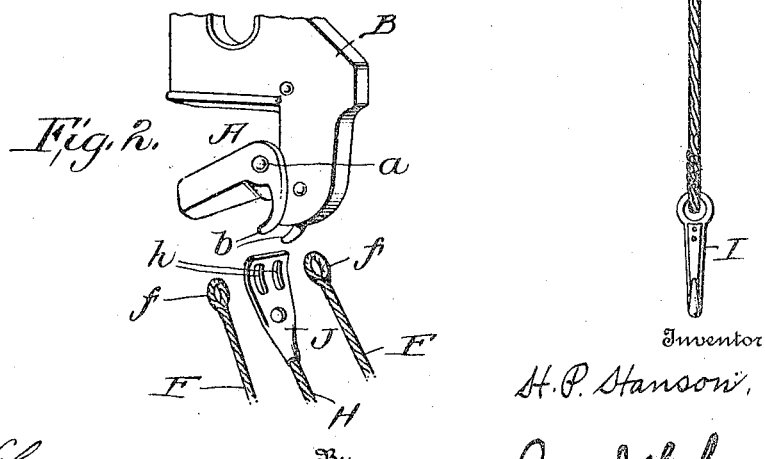
Witnesses
Olivia W. Holmes
J. J. Sheehy Jr.
Inventor
H. P. Hanson,
By
James J. Sheehy
Attorney

UNITED STATES PATENT OFFICE.

HAAKEN P. HANSON, OF ALBERT LEA, MINNESOTA.

HAY-SLING.

964,250.

Specification of Letters Patent.   Patented July 12, 1910.

Application filed March 25, 1910.  Serial No. 551,540.

*To all whom it may concern:*

Be it known that I, HAAKEN P. HANSON, citizen of the United States, residing at Albert Lea, in the county of Freeborn and State of Minnesota, have invented new and useful Improvements in Hay-Slings, of which the following is a specification.

My invention has to do with hay slings; and it contemplates the provision in a hay sling, of a peculiar and advantageous third cable which is designed to render the sling capable of gathering and adequately holding short hay such as two-cable slings are unfitted to gather and retain, and which is adapted when it is desired to use but two cables in the sling, to be expeditiously and easily removed.

With the foregoing in mind, the invention will be fully understood from the following description and claims when the same are read in connection with the drawings, accompanying and forming part of this specification, in which:

Figure 1 is a view in perspective of so much of a hay sling as is necessary to impart an exact understanding of the construction constituting the preferred embodiment of my invention. Fig. 2 is an enlarged detail perspective view showing the cables as they appear when gravitating away from the trip-latch of the sling subsequent to the release of said latch by the trigger. Fig. 3 is an enlarged broken elevation of my novel third cable.

Similar letters designate corresponding parts in all of the views of the drawings, referring to which:

A is a trip-latch such as ordinarily employed in the frame B of a hay sling; the said trip-latch A being pivoted at *a* and being provided with horns *b* and an upwardly extending arm *c*. C is a trigger carried by the said frame B and designed when raised to release the trip-latch A in the conventional manner.

D is the usual block carrying a hook *d* and equipped with a sheave *e*.

E is the conventional cable passed around the sheave *e* and connected in manner not shown with the frame B, and also connected in the ordinary or in any other suitable manner with the conventional hay carrier (also not shown).

F F are the ordinary cables of the sling, which are connected to a ring G carried by the hook *d* and are provided at their ends remote from the said ring G with eyes *f* designed to be engaged by the horns *b*, after the manner shown in Fig. 1, and H is my novel third cable as a whole. The said third cable is formed of material suitable to its purpose, and is provided at one end with a snap-hook I for its detachable connection with an eye *g*, preferably integral with the ring G, while at its opposite end it has a permanently attached head J, cast or otherwise suitably formed of metal and provided with two side by side apertures *h* which are preferably elongated or of oblong configuration as illustrated. It will also be observed by comparison of Figs. 1 and 2 that the head J is slightly curved in the direction of its length, this being advantageous since it facilitates engagement of the head with the horns, and enables the said head to readily gravitate away from the horns when the trip-latch is released.

In practice, my novel third cable H is connected with the ring G in the manner described, and the sling is used in conventional manner to gather and hold short hay, and then the eyes *f* on cables F are placed in engagement with the horns *b*, followed by the connection of the head J to the horns; the trip-latch A at that time being engaged and held by the trigger C. Then when the sling arrives at its destination, and the trigger C is raised in the ordinary manner, the trip-latch A gravitates to the position shown in Fig. 2 and by so doing releases the adjacent ends of the three cables, and enables the sling to discharge its burden.

When long hay is to be carried or the conditions are otherwise such that the employment of the third cable H is not necessary or desirable, the said third cable may be expeditiously and easily removed from the sling by simply disconnecting its snap-hook I from the eye *g* on ring G.

In addition to the practical advantages hereinbefore ascribed to my novel third cable H, it will be noted that the said cable is inexpensive and therefore is not likely to greatly increase the cost of the sling.

Having described my invention, what I claim and desire to secure by Letters-Patent, is:

1. In a hay sling, the combination of a suitable support, a suitably supported trip-latch provided with horns, movable means for normally holding the trip-latch against movement and the horns thereof against gravitation, cables connected to the said support and provided with eyes to receive the horns of the trip-latch, and a third cable connected with the said support and arranged intermediate the first-named cables and provided with a head in which are side by side apertures to receive the horns of the trip-latch.

2. In a hay sling, the combination of a suitable support, a ring connected therewith and provided with a depending eye, a suitably supported trip-latch provided with horns normally extending in a direction away from the said support, movable means for normally holding the trip-latch against movement and the horns thereof against gravitation, cables connected to the said ring, at opposite sides of the depending eye thereof, and provided with eyes to receive the horns of the trip-latch, and a third cable having at one end a snap-hook detachably connected to the depending eye of the ring and provided at its opposite end with a head curved in the direction of its length and provided in its curved portion with side by side oblong apertures to receive the horns of the trip-latch.

3. As a new article of manufacture, a hay gatherer and holder comprising a ring, cables connected at one end to said ring and having eyes at their opposite ends, and a third cable having at one end an apertured head and also having at its opposite end a snap hook detachably connected with said ring.

4. As a new article of manufacture, a hay gatherer and holder comprising cables, a ring to which said cables are connected at one end; said ring having a depending eye, and said cables having eyes at their ends remote from the ring, and a third cable having at one end a snap-hook engaged with the depending eye of the ring and equipped at its opposite end with a slightly curved head in which are side by side oblong apertures.

In testimony whereof I have hereunto set my hand in presence of two subscribing witnesses.

HAAKEN P. HANSON.

Witnesses:
 GEO. I. RODSATER,
 GEO. A. MCGEE.